United States Patent [19]
Senn

[11] 4,174,475
[45] Nov. 13, 1979

[54] WELDING STRUCTURE

[76] Inventor: Charles Senn, 12633 Wilfred Ave., Detroit, Mich. 48213

[21] Appl. No.: 828,983

[22] Filed: Aug. 30, 1977

[51] Int. Cl.² .............................................. B23K 11/10
[52] U.S. Cl. ....................................... 219/56; 219/58; 219/79; 219/87
[58] Field of Search ......................... 219/56, 58, 79, 87

[56] References Cited

U.S. PATENT DOCUMENTS

| | | | |
|---|---|---|---|
| 1,801,805 | 4/1931 | Dobrick | 219/56 |
| 2,810,817 | 10/1957 | Brems | 219/56 X |
| 3,405,743 | 10/1968 | Robinson | 219/56 X |
| 3,488,841 | 1/1970 | Stern | 219/56 X |
| 3,676,632 | 7/1972 | Gott | 219/56 X |
| 3,780,253 | 12/1973 | Senn | 219/58 |
| 4,068,110 | 1/1978 | Larsson | 219/56 |

FOREIGN PATENT DOCUMENTS 6807656 12/1969 Netherlands .............................. 219/79

*Primary Examiner*—Richard R. Kucia
*Attorney, Agent, or Firm*—Whittemore, Hulbert & Belknap

[57] ABSTRACT

Structure for spot welding airport concrete steel mesh. The structure includes supports for supporting a plurality of longitudinally extending large diameter reinforcing rods in parallel spaced apart relation, structure for separately feeding individual, transversely extending reinforcing rods onto the longitudinally extending reinforcing rods at a welding position, a plurlaity of transversely aligned welding guns for simultaneously welding a transversely extending reinforcing rod to each of the longitudinally extending reinforcing rods at the welding position, and piston and cylinder structure for subsequently indexing the welded transversely extending reinforcing rods and longitudinally extending reinforcing rods a predetermined distance longitudinally of the longitudinally extending reinforcing rods, repetitively until transversely extending reinforcing rods are welded in predetermined parallel spaced apart relation over the length of the longitudinally extending reinforcing rods.

6 Claims, 5 Drawing Figures

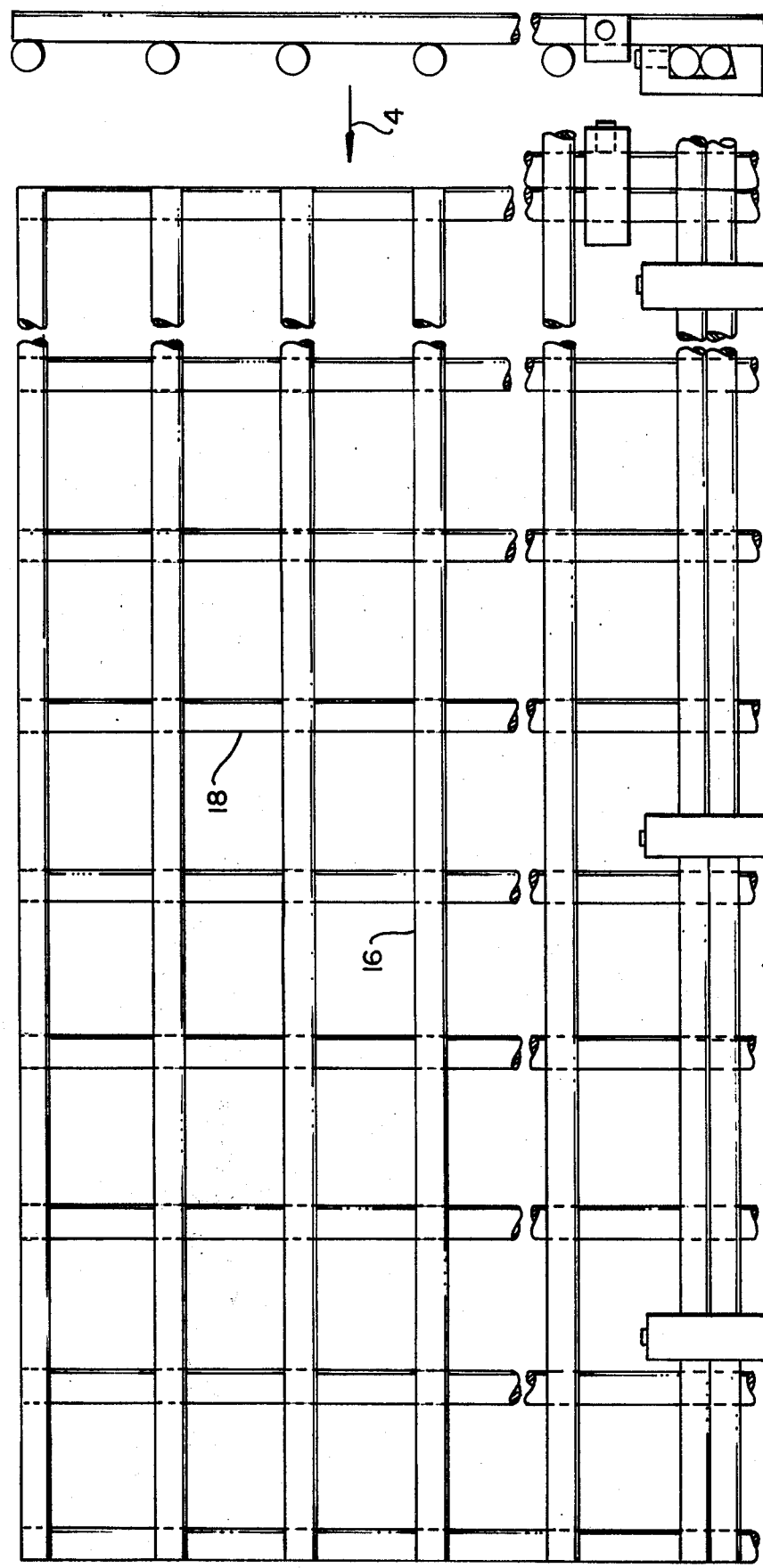

WELDING STRUCTURE

BACKGROUND OF THE INVENTION

1. Field of the Invention

The invention relates to a structure for welding airport concrete steel mesh, wherein each separate transversely extending reinforcing rod in the steel mesh is simultaneously welded to all the longitudinally extending spaced apart reinforcing rods, the separate transversely extending rods are automatically fed onto the longitudinally extending reinforcing rods of a welding position, and the welded transverse and longitudinal rods are automatically indexed away from the welding position.

2. Description of the Prior Art

Prior automatic mesh welders have usually not been capable of welding heavy reinforcing rods such as ¾" reinforcing rods into steel mesh such as that required for airport concrete runway reinforcement. Further, wherein steel mesh welding has been accomplished in the past, welding has been limited as to spacing between the reinforcing members due to welding gun diameter limitations, and welds have not always been satisfactory due to low welding gun pressures available. Wherein satisfactory mesh welding has been accomplished in the past, the equipment necessary therefor and the methods used have been complicated and therefore uneconomical.

SUMMARY OF THE INVENTION

According to the present invention, a simple, economical and efficient structure for spot welding airport concrete steel mesh or the like is provided.

The structure includes means for supporting a plurality of large diameter steel reinforcing rods in parallel spaced apart relation, means for automatically feeding a transversely extending reinforcing rod onto a plurality of transversely spaced apart, longitudinally extending reinforcing rods at a welding position, means for simultaneously welding the transversely extending reinforcing rod to each of the longitudinally extending reinforcing rods at the intersection thereof, and means for subsequently automatically indexing the welded transversely extending reinforcing rod and longitudinally extending reinforcing rods a predetermined amount.

The structure of the invention performs the steps of supporting the longitudinally extending reinforcing rods in parallel spaced apart relation, automatically feeding a transversely extending reinforcing rod onto the longitudinally extending reinforcing rods at a welding position, simultaneously welding the transversely extending reinforcing rod to each of the longitudinally extending reinforcing rods, automatically indexing the welded longitudinally extending and transversely extending reinforcing rods a predetermined amount, and repeating the feeding, welding and indexing steps until parallel transversely extending reinforcing rods are welded to the longitudinally extending reinforcing rods over the entire length thereof.

BRIEF DESCRIPTION OF THE DRAWINGS

FIG. 3 is a plan view of heavy steel mesh welded by the structure of the invention and secured together to form reinforcing for a concrete airport runway or the like.

FIG. 4 is an end view of the reinforcing mesh illustrated in FIG. 3, taken substantially in the direction of arrow 4 in FIG. 3.

FIG. 5 is a side view of the reinforcing mesh illustrated in FIG. 3, taken substantially in the direction of arrow 5 in FIG. 3.

DESCRIPTION OF THE PREFERRED EMBODIMENT

Figure 1:
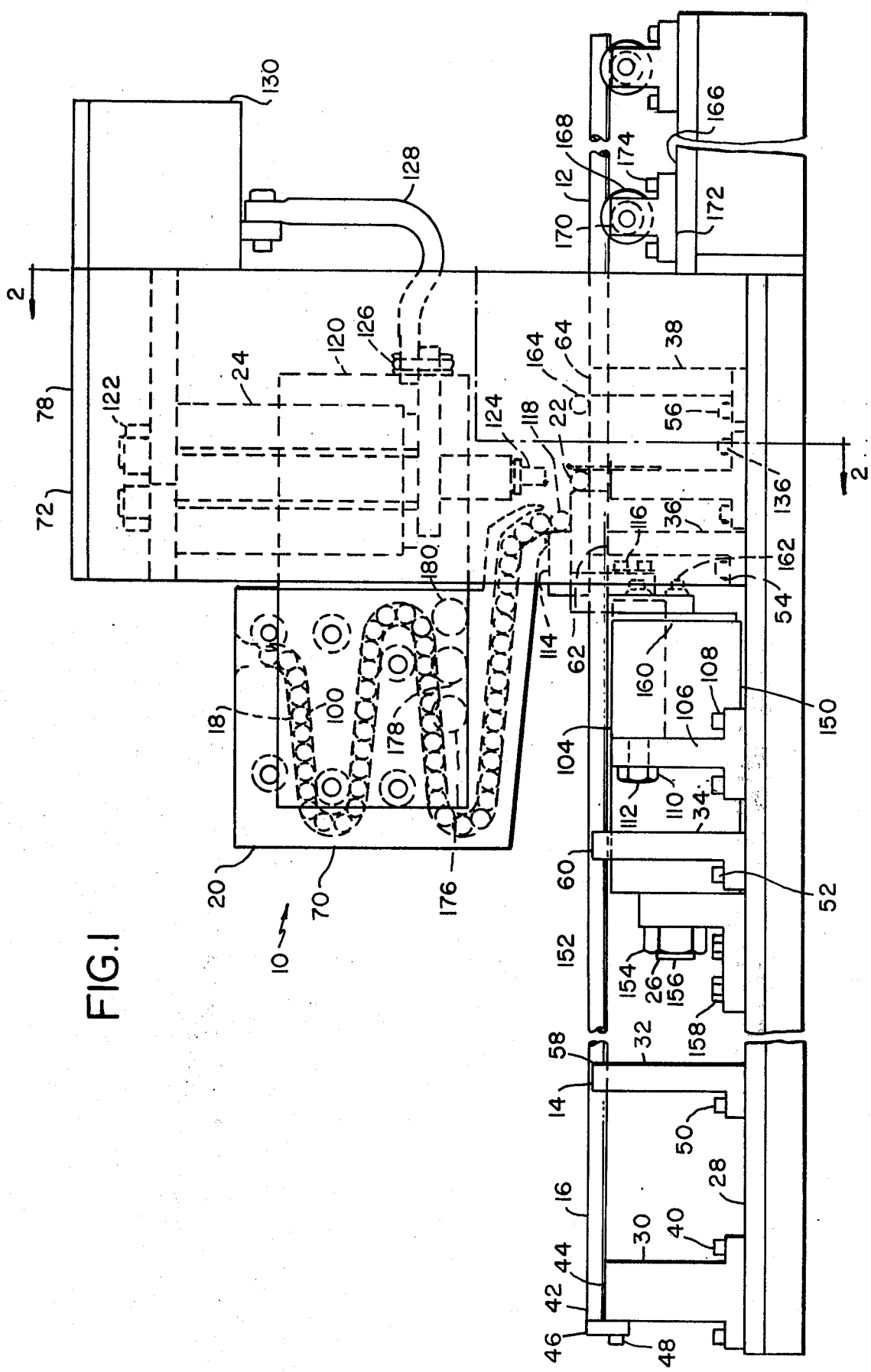
FIG. 1 is an elevation view of the structure for welding heavy steel mesh constructed in accordance with the invention.
Figure 2:
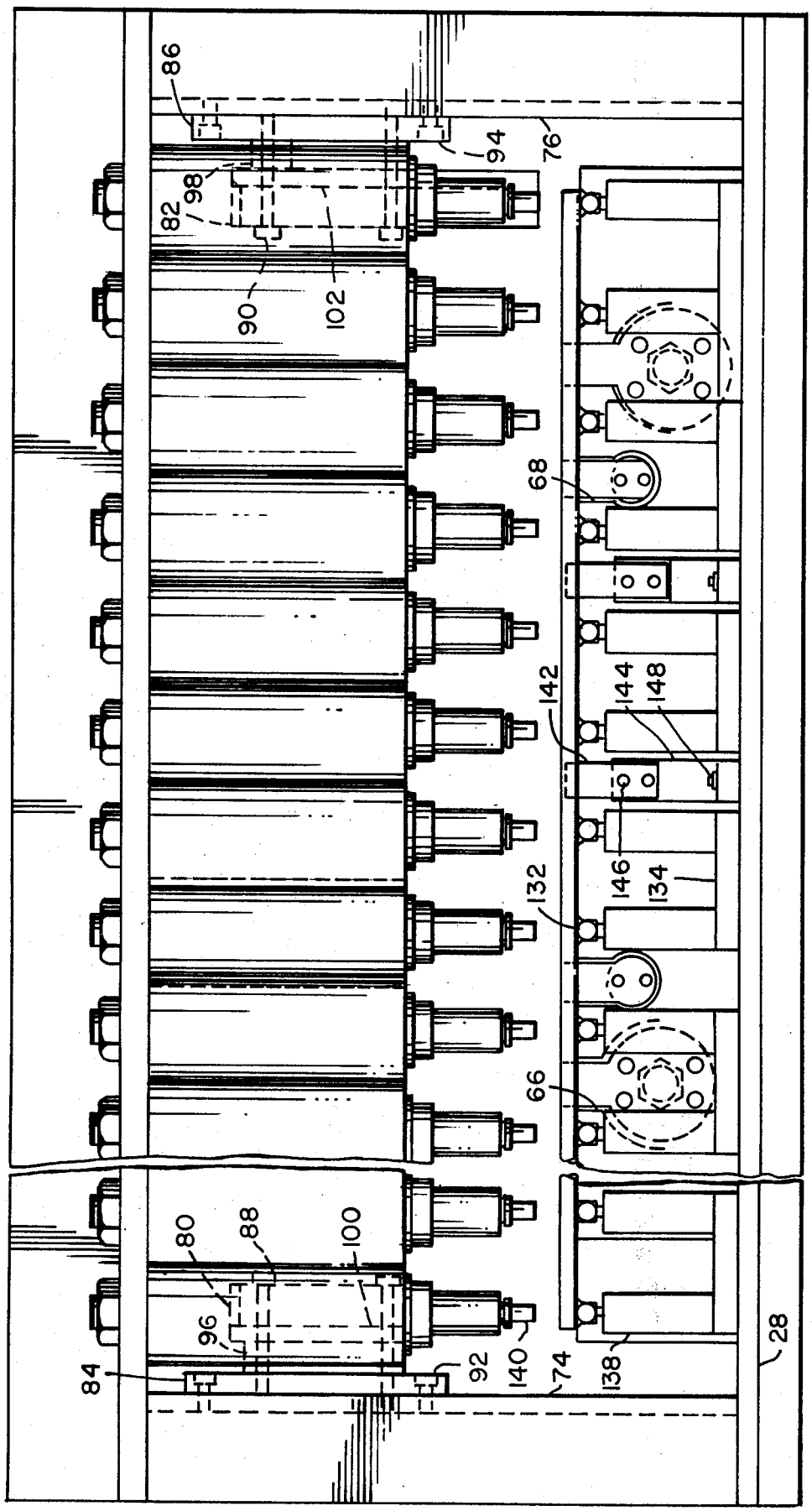
FIG. 2 is a partial section view of the structure for welding heavy steel mesh shown in FIG. 1, taken substantially on the line 2—2, FIG. 1.

The structure 10 for spot welding heavy concrete reinforcing mesh 12 such as illustrated in FIGS. 3–5 is best shown in FIGS. 1 and 2. As shown in FIGS. 1 and 2, the structure 10 includes means 14 for supporting longitudinally extending transversely spaced apart reinforcing rods 16 and the reinforcing mesh 12 resulting from spot welding the transversely extending reinforcing rods 18 to the longitudinally extending reinforcing rods 16 in longitudinally spaced apart relation, means 20 for separately, automatically feeding the transverse reinforcing rods 18 to a welding position 22, means 24 for simultaneously spot welding each separate rod 16 and rods 18 together at their intersection with the rod 18 in the welding position, and means 26 for automatically indexing the welded transversely extending reinforcing rods 18 and longitudinally extending reinforcing rods 16 away from the welding position 22.

In more detail, the supporting means 14 includes a base or table 28 and supports 30, 32, 34, 36 and 38. The support 30, as shown best in FIG. 1, has a generally inverted T-shaped cross section and is secured to the table 28 by convenient means such as bolts 40. The support 30 extends transversely of the table 28, which as shown best in FIG. 2 is slightly wider than the width of the reinforcing mesh 12 to be welded by the structure 10. The support 30 extends across substantially the entire width of the table 28. The ends 42 of the longitudinally extending reinforcing rods 16 are positioned on the top 44 of the support 30 and are abutted against the locating bar 46 secured to the support 30 by convenient means such as bolts 48. The locating bar 46 extends along substantially the entire length of the support 30.

The supports 32, 34, 36 and 38 illustrated in FIG. 1 are each L-shaped in cross section and are secured to the table 28 by convenient means such as bolts 50, 52, 54 and 56. Again the supports 32, 34, 36 and 38 extend transversely across the table 28 for substantially the entire width of the table. Thirty-two 13/16" transversely spaced apart notches 58, 60, 62 and 64 are provided in the respective supports 32, 34, 36 and 38 to receive the ¾" longitudinally extending reinforcing rods 16.

In the particular mesh to be welded, there are thirty-two longitudinally extending reinforcing rods, seven of which have six 3.75" spaces between the centers thereof distributed transversely of the structure 10, and twenty-six of which have twenty-five 3.87" spaces between the centers thereof to provide a reinforcing mesh 120" wide with ¾" longitudinally extending reinforcing rods 16.

In addition to the notches 62, the support 36 includes notches 66 and 68 therein as required to permit passage of portions of the indexing structure 26 and the feed structure 20 therethrough, as will be considered subsequently.

The feed means 20 includes the hopper 70 supported from the inverted U-shaped fabricated frame 72. The frame 72 includes the vertical members 74 and 76 supporting the horizontal member 78. The vertical members 74 and 76 as shown are supported at the sides of the table 28 and may be secured thereto by convenient means, not shown.

The hopper 70 includes the guide members 80 and 82 at each side thereof which are secured to plates 84 and 86 at the opposite sides of the table 28 by convenient means such as bolts 88 and 90. The plates 84 and 86 are in turn secured to the vertical members 74 and 76 of the frame 72 by convenient means such as bolts 92 and 94. Cylindrical spacers 96 and 98 extend between the plates 84 and 86 and the guide members 80 and 82 of the hopper 70 to insure rigid attachment of the guide members 80 and 82 to the plates 84 and 86 in spaced relation thereto, as shown best in FIG. 2.

Guide members 80 and 82 have channels 100 and 102 therein for receiving the ends of the transverse reinforcing rods 18 therein. The reinforcing rods 18 thus extend between the guide members 80 and 82 and proceed downwardly through a path defined by the guide channels 100 and 102 under gravitation forces.

The means 20 for feeding the reinforcing rods 18 further includes a plurality of identical piston and cylinder structures 104 positioned at spaced apart locations transversely of the table 28. Each of the piston and cylinder structures 104 are supported by a separate inverted T-shaped support 106 secured to the table 28 by convenient means such as bolts 108. The piston and cylinder structures 104 are secured to the T-shaped support 106 by convenient means such as bolts 110 secured to studs 112 which are secured by convenient means to the cylinders of the piston and cylinder structures 104.

The piston and cylinder structures 104 further include an L-shaped transverse rod positioning member 114 secured thereto by means of bolts 116. On actuation of the piston and cylinder structure 104, the bottom transverse rod 118, as shown in FIG. 1, is moved to the right in FIG. 1 approximately 1-and-½ inches so that it is caused to drop into the welding position 22, as shown in FIG. 1.

The means 24 for welding the reinforcing rods 16 to a reinforcing rod 18 includes a plurality of welding guns 120 secured to the transversely extending member 78 of the frame 72 by bolts 122. The welding guns 120 may be as shown in applicant's co-pending application Ser. No. 825,255, filed Aug. 17, 1977 now U.S. Pat. No. 4,137,828. For closer weld spacing, the welding guns 120 have staggered center lines. The electrodes 124 secured to the welding guns 120 are therefore offset radially of the guns, as shown in applicant's U.S. Pat. Nos. 3,008,033, 3,463,895 and 3,780,253. The electrodes 124 are all brought out to a point 126 where they are connected by welding cables 128 to welding transformers 130. The welding transformers 130 are provided with electrical energy for spot welding the reinforcing rods at their intersections in position 22 simultaneously from an electrical source, not shown.

The lower electrodes 132 are provided in pairs as shown best in FIG. 2. That is, two adjacent welding guns 120 complete a complete circuit from one welding gun to one lower electrode 132 through a base connection between two adjacent lower electrodes through the second lower electrode and subsequently back to the adjacent welding gun, as described more fully in U.S. Pat. No. 3,780,253. The bottom electrodes 132 are secured to the table 28 by convenient means such as bolts 136.

The operation of the welding guns 120 and the bottom electrodes 132 is in pairs, as set forth in U.S. Pat. No. 3,780,253 referenced above. In view of the use of thirty-one spaces transverse of the mesh to be welded and the consequent thirty-two guns required, no false guns or electrodes are needed in the structure 10.

Leaf springs 142 are supported on T-shaped supports 144 in spaced apart transverse relation along the row of lower electrodes 132 to hold the transversely extending reinforcing rods 18 in the welding position 22. The springs 142 are secured to the T-shaped supports 144 by convenient means such as bolts 146 and the T-shaped supports 144 are secured to the table 28 by bolts 148.

The means 26 for indexing the longitudinally extending reinforcing rods 16 and the transversely extending reinforcing rods 18 welded thereto includes the larger piston and cylinder structures 150 secured to the L-shaped brackets 152 by convenient means such as a bolt 154 and stud 156. The brackets 152 are secured to the table 128 by further bolts 158. An L-shaped mesh engaging member 160 is secured to each piston and cylinder structure 150 by convenient means such as a bolt 162.

When the piston and cylinder structure 150 is actuated, the transversely extending reinforcing rod 18 at the welding position 22, which has just been welded to the longitudinally extending reinforcing rods 16, is indexed approximately three inches to the position 164 along with the longitudinally extending reinforcing rods 16 and the other transversely extending reinforcing rods which have been welded to the longitudinally extending reinforcing rods 16 in previous cycles of the structure 10.

On return of the piston and cylinder structures 150 to the position shown in FIG. 1, the structure 10 is ready to receive a further transversely extending reinforcing rod 16 in the welding position 22.

A table 166 is provided adjacent the table 28 and includes rollers 168 thereon for receiving the welded mesh. The rollers 168 are mounted in bearings 170, secured in inverted T-shaped cross section supports 172 which are bolted to the table 166 by bolts 174. Indexing of the welded mesh is facilitated by the rollers 168.

In overall operation of the structure 10 for automatically welding airport concrete steel reinforcing mesh with the piston and cylinder structures 140 and 150 initially in the condition shown in FIG. 1, a plurality of parallel spaced apart, longitudinally extending reinforcing rods 16 are placed on the supporting means 14 with their ends 42 against the stop 46. A plurality of transversely extending reinforcing rods 18 are placed in the hopper 70, with their ends in the guide channels 100 and 102 so that the bottom transversely extending reinforcing rod 18 is in the position of the rod 118 in FIG. 1 to which all transversely extending reinforcing rods 18 are sequentially fed by gravity.

The piston and cylinder structure 104 is then actuated to move to the right, FIG. 1, by convenient means such as the automatically operated hydraulic valve 176 shown secured to the hopper 70 for convenience in FIG. 1. The piston and cylinder structure 104 thus moves the bottom reinforcing rod 18 from the position shown at 118 to the welding position 22 shown in FIG. 1.

With a transversely extending reinforcing rod 18 in the welding position, the piston and cylinder structure 104 is returned to the position shown in FIG. 1 and a subsequent transversely extending reinforcing rod positions itself by gravity in the position 118.

By means of the second hydraulic valve 178, the welding guns 120 are actuated to apply welding pressure between the upper electrodes 124 and the lower electrodes 132, at which time a spot welding current is passed therebetween to cause simultaneous welds along the length of the transversely extending reinforcing rod 18 at each intersection with a longitudinally extending reinforcing rod 16. When the welds are complete, the welding guns are withdrawn, again by means of automatic operation of the valve 178.

On withdrawal of the welding guns 120, the large piston and cylinder structures 150 are actuated by hydraulic valve 180 to index the transversely extending reinforcing rod which has just been welded to the longitudinally extending reinforcing rods 16 into the position 164, after which the piston and cylinder structure 150 is returned to the position illustrated in FIG. 1.

The above indicated cycle is repeated until a complete reinforcing mesh has been welded, at which time the welded reinforcing mesh is removed from the rollers 168 and new longitudinally extending reinforcing rods 16 are positioned in the structure 10 to start the cycle of production of steel mesh over again.

The hydraulic valves 176, 178 and 180 may be automatically actuated by convenient electrical, pneumatic or hydraulic signals in accordance with available valve designs. It is not intended to claim novelty for specific valves herein.

In the particular embodiment of the invention illustrated in FIGS. 1 and 2, steel mesh such as shown in FIGS. 3-5 may be produced. The steel mesh of FIGS. 3-5 includes 32 longitudinally extending ¾" reinforcing rods having six 3.75" spaces, and twenty-five 3.78" spaces therebetween, to provide a ten-foot wide reinforcing mesh. The length of the reinforcing mesh produced is 50-ft. ¾ in. with three-inch spacing between 201, ¾" reinforcing rods.

Each of the welding guns 120 has a welding pressure of 2600 pounds at 1000 pounds line pressure, which guns exert in simultaneous welding over all of the spot welds along one transversely extending reinforcing rod, as disclosed above, a pressure of approximately 80,000 pounds. Complete accurate spot welding is thus assured.

While one embodiment of the present invention has been considered in detail, it will be understood that other embodiments and modifications thereof are contemplated. It is the intention to include all such embodiments and modifications within the scope of the invention as are defined by the appended claims.

What I claim as my invention is:

1. Structure for welding heavy steel mesh comprising means for supporting longitudinally extending reinforcing rods on one side of welding means in transversely spaced apart parallel positions, means operably associated with the longitudinally extending reinforcing rods for automatically feeding a transversely extending reinforcing rod fed thereto onto the longitudinally extending reinforcing rods at a predetermined welding position from the one side of the welding means comprising a mesh engaging member having a guiding surface extending parallel to the longitudinally extending reinforcing rods and positioned above the longitudinally extending reinforcing rods and positioned above the longitudinally extending reinforcing rods approximately the diameter of the transversely extending reinforcing rods and extending on the one side of the welding means to terminate in an abutment surface adjacent the welding position, a positioning member extending above the guiding surface on the mesh engaging member, and piston and cylinder structure mounting said positioning member for reciprocal movement toward and away from the welding position whereby a transversely extending reinforcing rod positioned on the guiding surface of the mesh engaging member may be moved into the welding position at the welding means adjacent the abutment surface of the mesh engaging member on movement of the positioning member toward the welding position, and a second transversely extending reinforcing rod is allowed to move onto the guiding surface of the mesh engaging member on movement of the positioning member away from the welding position, means for positioning transversely extending reinforcing rods onto the automatic feeding means one at a time, means at the welding position operably associated with the supporting, positioning and feeding means for simultaneously welding a transversely extending reinforcing rod to the longitudinally extending reinforcing rods at the intersections of the longitudinally extending reinforcing rods and the transversely extending reinforcing rod, and means operably associated with the welded transversely extending and longitudinally extending reinforcing rods for automatically indexing the welded reinforcing rods to position the longitudinally extending reinforcing rods for receipt of a subsequent transversely extending reinforcing rod at the welding position in parallel spaced apart relation to the welded transversely extending reinforcing rod, including the mesh engaging member and piston and cylinder means secured thereto for moving the mesh engaging member reciprocally in the direction of extent of the longitudinally extending reinforcing rods a distance equal to the desired spacing between the transversely extending reinforcing rods.

2. Structure as set forth in claim 1, wherein the means for supporting the longitudinally extending reinforcing rods comprises an end stop for abutting one end of each of the parallel spaced apart longitudinally extending reinforcing rods, spaced apart means along the length of the longitudinally extending reinforcing rods for supporting each of the longitudinally extending reinforcing rods, and rollers for subsequently receiving the longitudinally extending reinforcing rods welded to the transversely extending reinforcing rods.

3. Structure as set forth in claim 1, wherein the means for positioning transversely extending reinforcing rods onto the longitudinally extending reinforcing rods comprises a pair of guides for guiding the opposite ends of the transversely extending reinforcing rods each having a channel for receiving the ends of the transversely extending reinforcing rod therein which channels face each other above the longitudinally extending reinforcing rods and which channels terminate adjacent the feeding means.

4. Structure as set forth in claim 1, wherein the means for simultaneously welding the transversely extending reinforcing rod to the longitudinally extending reinforcing rods comprises a plurality of separate vertically extending welding guns positioned in line over the transversely extending reinforcing rod in the welding position, their vertical axes staggered about the transversely extending reinforcing rod with the welding guns being in separate pairs having upper electrodes secured thereto and lower welding electrodes positioned over and beneath the transversely extending reinforcing rod and longitudinally extending reinforcing rods, whereby each pair of guns and rods provide a continuous path for welding current.

5. Structure as set forth in claim 1, and further including spring means operably associated with the transversely extending reinforcing rods for resiliently securing the transversely extending reinforcing rod in the welding position.

6. Structure for welding heavy steel mesh comprising means for supporting longitudinally extending reinforcing rods on one side of welding means in transversely spaced apart parallel positions including an end stop for abutting one end of each of the parallel spaced apart longitudinally extending reinforcing rods, spaced apart means along the length of the longitudinally extending reinforcing rods for supporting each of the longitudinally extending reinforcing rods, and rollers for subsequently receiving the longitudinally extending reinforcing rods welded to the transversely extending reinforcing rods, means operably associated with the longitudinally extending reinforcing rods for automatically feeding a transversely extending reinforcing rod fed thereto onto the longitudinally extending reinforcing rods at a predetermined welding position from the one side of the welding means comprising a mesh engaging member having a guiding surface extending parallel to the longitudinally extending reinforcing rods and positioned above the longitudinally extending reinforcing rods approximately the diameter of the transversely extending reinforcing rods and extending on the one side of the welding means to terminate in an abutment surface adjacent the welding position, a positioning member extending above the guiding surface on the mesh engaging member, and piston and cylinder structure mounting said positioning member for reciprocal movement toward and away from the welding position whereby a transversely extending reinforcing rods positioned on the guiding surface of the mesh engaging member may be moved into the welding position at the welding means adjacent the abutment surface of the mesh engaging member on movement of the positioning member toward the welding position, and a second transversely extending reinforcing rod is allowed to move onto the guiding surface of the mesh engaging member on movement of the positioning member away from the welding position, means for positioning transversely extending reinforcing rods onto the automatic feeding means one at a time including a pair of guides for guiding the opposite ends of the transversely extending reinforcing rods each having a channel for receiving the ends of the transversely extending reinforcing rod therein which channels face each other above the longitudinally extending reinforcing rods and which channels terminate adjacent the feeding means, means at the welding position operably associated with the supporting, positioning and feeding means for simultaneously welding a transversely extending reinforcing rod to the longitudinally extending reinforcing rod at the intersections of the longitudinally extending reinforcing rods and the transversely extending reinforcing rods includes a plurality of separate vertically extending welding guns positioned in line over the transversely extending reinforcing rod in the welding position, their vertical axes staggered about the transversely extending reinforcing rod with the welding guns being in separate pairs having upper electrodes secured thereto and lower welding electrodes positioned over and beneath the transversely extending reinforcing rod and longitudinally extending reinforcing rods, whereby each pair of guns and rods provide a continuous path for welding current, spring means operably associated with the transversely extending reinforcing rods for resiliently securing the transversely extending reinforcing rod in the welding position, and means operably associated with the welded transversely extending and longitudinally extending reinforcing rods for automatically indexing the welded reinforcing rods to position the longitudinally extending reinforcing rods for receipt of a subsequent transversely extending reinforcing rod at the welding position in parallel spaced apart relation to the welded transversely extending reinforcing rod, including the mesh engaging member and piston and cylinder means secured thereto for moving the mesh engaging member reciprocally in the direction of extent of the longitudinally extending reinforcing rods a distance equal to the desired spacing between the transversely extending reinforcing rods.

* * * * *